US008806038B2

(12) United States Patent
Feldman et al.

(10) Patent No.: US 8,806,038 B2
(45) Date of Patent: Aug. 12, 2014

(54) METHOD AND SYSTEM FOR UPDATING MEDIA LISTS IN PORTABLE MEDIA DEVICES

(75) Inventors: Evan Feldman, Woodinville, WA (US); Jonathan Nelson, Seattle, WA (US)

(73) Assignee: Intel Corporation, Santa Clara, CA (US)

(*) Notice: Subject to any disclaimer, the term of this patent is extended or adjusted under 35 U.S.C. 154(b) by 439 days.

(21) Appl. No.: 12/165,277

(22) Filed: Jun. 30, 2008

(65) Prior Publication Data

US 2009/0006542 A1    Jan. 1, 2009

Related U.S. Application Data

(60) Provisional application No. 60/947,273, filed on Jun. 29, 2007.

(51) Int. Cl.
    *G06F 15/16*     (2006.01)
(52) U.S. Cl.
    USPC .......................... 709/229; 709/203; 709/224

(58) Field of Classification Search
    USPC .......................... 709/203, 224, 229
    See application file for complete search history.

(56) References Cited

U.S. PATENT DOCUMENTS

| 8,230,099 | B2 * | 7/2012 | Weel | 709/231 |
| 2006/0265329 | A1 * | 11/2006 | Hug | 705/50 |
| 2007/0174147 | A1 * | 7/2007 | Klein, Jr. | 705/28 |
| 2008/0016205 | A1 * | 1/2008 | Svendsen | 709/224 |
| 2008/0189295 | A1 * | 8/2008 | Khedouri et al. | 707/10 |
| 2008/0235588 | A1 * | 9/2008 | Gonze et al. | 715/719 |
| 2009/0070185 | A1 * | 3/2009 | Farrelly | 705/10 |

\* cited by examiner

*Primary Examiner* — Glenford Madamba
(74) *Attorney, Agent, or Firm* — Stoel Rives, LLP

(57) ABSTRACT

A method and apparatus for updating a media list or a media list collection of a portable media player device is disclosed herein. In various embodiments, the updates are generated by a proxy or a third party server, based at least in part on data gathered for media preferences for a user of the portable media play device and one or more other users of one or more portable media player devices. In various embodiments, the method is practiced respecting the access rights of the media files (if access rights are required). Other embodiments may also be described and claimed.

25 Claims, 4 Drawing Sheets

METHOD AND SYSTEM FOR UPDATING MEDIA LISTS IN PORTABLE MEDIA DEVICES

RELATED APPLICATIONS

The present application claims the benefit of priority from and is related to commonly-owned U.S. Provisional Application No. 60/947,273 filed Jun. 29, 2007. The disclosure of the foregoing application is hereby incorporated by reference in its entirety, including any appendices or attachments thereof, for all purposes.

FIELD OF PRESENT INVENTION

The present invention relates to the field of portable media player devices. More specifically, the present invention relates to a method and system for updating media lists in portable media devices.

BACKGROUND OF THE PRESENT INVENTION

Portable media player devices are increasing in popularity. A portable media player device is a transportable device that plays one or more media file types, including text, audio, video, interactive, and other media file types. For purposes of this disclosure, a portable media player device does not include a general purpose laptop or tablet computer, nor any computing device attached or installed on a mobile vehicle (such as a dash mounted radio or DVD player in an automobile, but rather includes a handheld device (also referred to as a palm-sized device) for the purpose of displaying and/or playing media files. The hardware and/or software components embodied in the device for the displaying and playing of media files are collectively referred to as a media player. Examples of portable media player devices are the iPod available from Apple Computer of Cupertino, Calif., the Zune available from Microsoft Corporation of Redmond, Wash., the Ibiza™ Rhapsody® from Varia Mobil of Seattle, Wash., and other like devices.

In addition to allowing users to store and play media files, many portable media player devices allow users to organize media files into groups or access groups of media files organized or stored for access by a service, a content provider, or another entity. Groups of media files or their titles are sometimes referred to as "channels" or "playlists," with playlists generally having a finite number of media file titles and channels having a continuous number of media files. Files associated with a playlist or channel may be specified in a particular order or the files may be specified in a random order. Likewise, when accessed by a user, the files associated with a playlist may also be played in the specified order or in a random order. A playlist may be static, i.e., the playlist may always be associated with the same number of media files, or it may be dynamic, i.e., the files associated with the playlist may change. For example, a dynamic playlist may be associated with the twenty most popular songs, and the songs associated with the playlist may change as the most popular songs change.

Despite the continued availability of new and interesting media files, however, most users infrequently modify or update a playlist once the playlist has been created. One reason for this may be that many portable media player devices can only be modified by a user on a computer and cannot be modified directly on a portable media player device (in part because of the constrained input capability due to the inherent size constraints of portable devices). Other portable media player devices allow sharing of playlists and media between portable media devices, but only if the portable media player devices are in an immediate proximity to the user. The shared media also typically has limited play time unless the right to play is subsequently confirmed/validated (an attempt to address the digital right issues that arise with the sharing of media). These factors significantly limit the number and variety of playlists available for sharing with a user.

BRIEF DESCRIPTION OF DRAWINGS

The present invention is illustrated by way of example and not by way of limitation in the figures of the accompanying drawings, in which like references indicate similar elements and in which.

DESCRIPTION OF TECHNOLOGY

Figure 1:
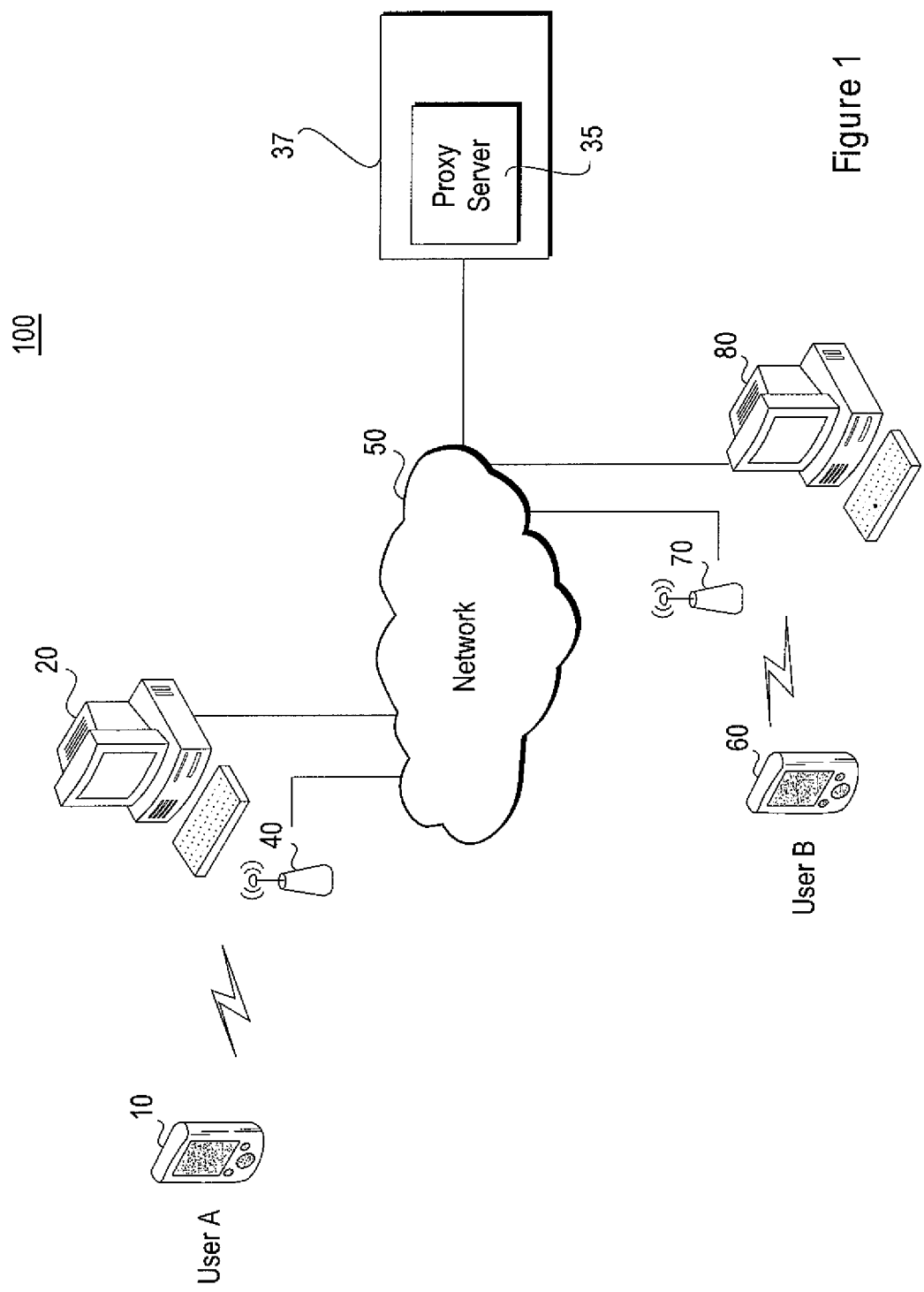
FIG. 1 illustrates an overview of the present invention, in accordance with an embodiment of the invention.

In the following detailed description of exemplary embodiments of the invention, reference is made to the accompanying drawings, which form a part hereof, and which show, by way of illustration, specific exemplary embodiments by which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Various operations will be described as multiple discrete operations. In turn, in a manner that is most helpful in understanding the present invention, however, the order of description should not be construed as to imply that these operations are necessarily order dependent. In particular, these operations need not be performed in the order of presentation.

Furthermore, reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A method and system for updating of media lists in portable media player devices via a proxy server is described. For purposes of this description, groups of media files organized together, whether finite or continuous, will be collectively referred to as "media lists", or "media playlist." In various embodiments, updates to a media list or a "new" media list for a portable media player device are generated based upon media preferences gathered for a plurality of users, while respecting the digital rights of the media files. Thus, in these embodiments, suggested media titles of songs, videos, photos, podcasts or other preferred media may be used to update a user's playlist or may be added to the user's playlist collection as an additional playlist, based upon playlist or playlists of one or more users, or one or more community playlists, with similar media preferences, with the digital rights of the video, photos, podcasts etc. where applicable being fully respected. In various embodiments, for each media title added to an updated media list or added via a "new" media list, the proxy server further determines whether access to a media file requires having requisite access rights, if so, whether the user has access rights to the corresponding media files. If no access rights are required or access rights apply and exist, then the corresponding media files or access links to the corresponding media files may be transmitted by the proxy server to the portable media device of the user. If access rights apply but the first user does not have access rights to the corresponding media files, then the proxy server may update the user's media list or the new media list with the titles, but not provide the portable media player device with the actual media files nor the access links. In various embodiments, the proxy server may further provide information as to how to acquire the necessary rights to access the added media files, e.g. by subscription to a third party service or by purchasing the performance rights for the titles. In various embodiments, the information may include access links to the third party service or a third party site where performance rights for the titles may be purchased and/or otherwise acquired.

FIG. 1 illustrates an overview of the present invention 100 in accordance with various embodiments. A remote media service 37 includes a proxy server 35 that may transmit information such as updates to a media list or a media list to be added to a media list collection to each of User A and User B of respective portable media player devices 10 and 60 via network 50 and respective wireless access points 40 and 70, while respecting the access rights of the media files being added to the media lists or media list collection of User A and User B when access rights apply. Network 50 may include for example a Wide Area Network (WAN), Local Area Network (LAN) (e.g. Ethernet), an intranet, internet, a public switched telephone network (PSTN) as well as a wireless communications network (e.g. WiFi), or combination thereof. In various embodiments, remote media service 37 includes for example a software and/or hardware facility for providing media list updates, media files and/or information about media files to users and for facilitating user-to-user sharing of media lists. As shown, each of portable media player devices 10 and 60 may have a number of media files or access links to media files stored thereon. The media files may have/require or not require access rights. Portable media player devices 10 and 60 may be associated with respective computers 20 and 80 connected to network 50. Each of User A and User B may define or create one or more media playlists or media lists, organizing all or subsets of the media files, in the respective portable media player devices 10 and 60, in associated computers 20 and 80, and/or with remote media service 37 via proxy server 35. As will be explained in more details below, proxy server 35 may transmit updates to the media lists or add to the media list collections of Users A and B on the portable media player devices 10 and 60 as well as computers 20 and 80, based on similarity between the media preference of Users A and B and/or media preference of Users A and B with other users (not shown), as inferred from the media lists and/or media files stored in or accessible to portable media player devices 10 and 60 (and other users' portable media player devices (not shown)), while respecting the access rights of the media files when access rights apply. It should be noted that for ease of understanding, only users A and B are shown in FIG. 1, however, embodiments of the invention are not limited to just two users, but may be practiced for a community of users, whose size is subject only to the computing resources of the proxy and third party servers, and the networking/telecommunication bandwidths.

Alternatively or additionally to a user creating his or her own media list, the remote media service 37 may create and push a media list for a user. The media list may be based on the user's implicit interests. For example, a media list may be created or updated based on the media files accessed most frequently by the user, the media files ranked highest by the user, the media files most recently played by the user, and/or other parameters. The remote media service 37 may also create a media list based on information that the user has explicitly communicated to the remote media service 37, such as personal information and interests conveyed when a user signs up for a service offered by the remote media service or in a user profile. For example, the user may request that a media list is created that is limited to a particular type of media file, genre, artist, category, or other parameter. Note that a media list may include a single media file type or multiple media file types. For example, one media list may be devoted to favorite songs, while another is devoted to favorite photos. In the alternative, a single media list may include different types of media files, such as slide shows that include songs, photos and video.

Figure 2:
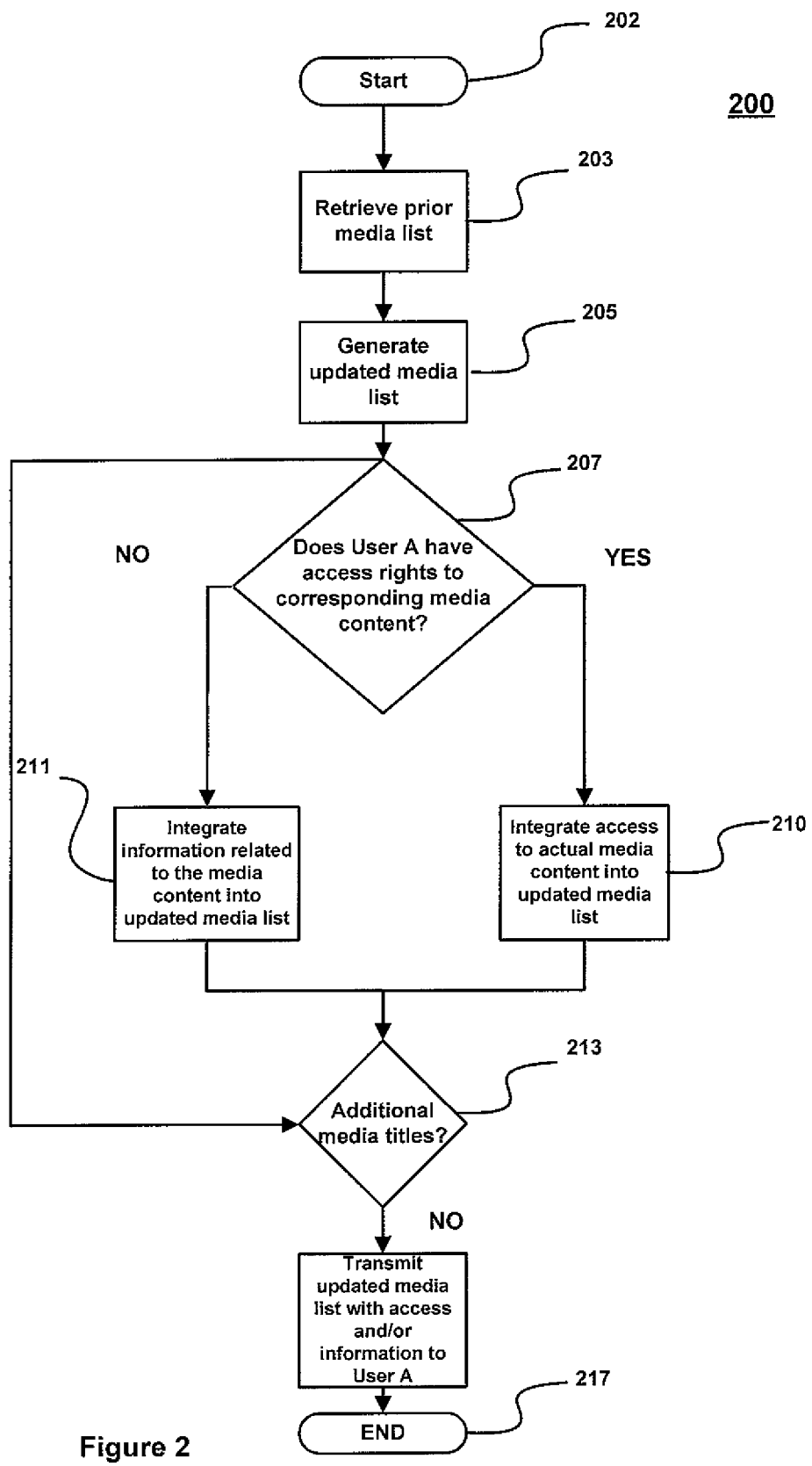
FIG. 2 is a flow chart illustrating an embodiment of the invention.

FIG. 2 is a flow chart that depicts a method 200 of updating or sharing a media list via proxy server 35 in accordance with an embodiment of the invention. In the embodiment shown, a media list on a portable media player device associated with User A may be updated or added based upon a media list on a portable media player device associated with one or more other users, which may or may not be associated with proxy server 35, e.g. User B and/or other users not shown. In the embodiment, rather than being limited to an update from a user whose portable media player device must be in the proximity of User A's media portable media player device, User A can have his media list on his portable media player device updated or have a media list added in accordance with a media list on User B's portable media player device, even if User B's media portable media player device is remotely disposed from User A's portable media player device, and only communicatively coupled to each other and/or to the server via a network. In other embodiments, User A can have his media list on his portable media player device updated or have a media list added in accordance with a media list created by proxy server 35 or by a third party server/service accessible to proxy server 35. In various embodiments, User A may select User B from any number of users of portable media player devices associated with service 37/server 35, or a community associated with service 37/server 35 or a third party service. The updates and/or additions are made based at least in part on similarity between the media preferences of the users/ communities and/or media preferences intrinsic of a media list.

In the embodiment shown, after start block 202, proxy server 35 retrieves one or more prior media lists of a first portable media player device associated with User A, or information about media stored on and/or accessed using the first portable media player device at block 203. In various embodiments, this prior media list and/or media storage/accessed information can be retrieved from storage in the proxy server 35, additional storage in the remote media service 37 or from the first portable media player device associated with User A. As described above, this prior media list may have been previously created or defined by user A or by remote media service 37 and/or may have been updated previously by the method as described in the embodiment illustrated herein.

After retrieving the prior media list and/or media stored/accessed at block 203, an updated or a new media list may be generated and/or retrieved by proxy server 35 at a next block 205. In various embodiments, this may include determining one or more similarities between media preferences of User A and one or more other users, e.g. User B, and/or a community associated with the proxy or a third party service. The determining may be based on any one of a number of quantitative analysis techniques, including but not limited to Bayesian analysis, and so forth on data, such as media lists of the portable media player devices and/or media files stored and/or accessed by the portable media player device. In various embodiments, the determining may also include gathering of the relevant data related to the media preferences of User A and one or more other users, e.g. User B, and/or one or more communities associated with proxy and/or third party service. In various embodiments, the gathering of data may be in real time or on an on-going basis prior to the determining of the preferences and comparing the preferences for similarities. One or more various attributes can be compared such as for example a preferred music genre or preferred podcast genre. Thus, for example if User A and the one or more other users, such as User B, and/or one or more communities frequently access podcasts related to technology and one of the other users, e.g. User B and/or proxy/third party server has a media title that would appear relevant to User A, the technology podcast title on User's B's media list or a media list of the proxy/third party service may be suggested to User A in the form of an update to a media list of User A to add the media title to User A's prior media list or part of a media list to be added to User A's media list collection. In various embodiments, a media list to be added or an update to User A's media lists can also be based upon the media lists of not only User B's media list but as alluded to earlier, on a plurality of users (not shown in FIG. 1) with similar media preferences or can be based upon media titles deemed to be of interest to User A by proxy server 35. In various embodiments, User A may also specifically request an update from a particular user or request that proxy server 35 update User A's list based upon specific parameters or particular media lists that may be available to all subscribers (e.g. the most popular media lists, top 20 songs, etc.). Accordingly, the updates or new media lists may be generated based upon a media list explicitly selected from a plurality of media lists by User A. In various embodiments, the User A may be a subscriber to the selected media list, e.g. such as for example a Top Tracks media list created or assembled by the proxy server or the remote media service.

After the updates or the new media list has been generated and/or retrieved at block 205, the proxy server may determine at a next block 207 for the media title or titles being added to the updated media list or added via a new media list, whether proper access rights are required for playing the media title/titles, and if required, whether User A or the portable media player device associated with User A has the requisite access rights to the corresponding media content, also sometimes referred to as "corresponding media" or simply "media content." In various embodiments, the proxy server 35 will search for the corresponding media content for each of the media titles in a media library of the remote media service 37 using an identifier included among metadata associated with the media title (e.g. a song, a video, a podcast or other media type) to determine whether a media title requires access rights, and if so, whether User A has the requisite access rights. If the media content is not found in the media library, the proxy server 35 may also search third party service providers and outside sources for availability and whether access rights are required and if access rights are required, whether User A has the requisite access rights.

In various embodiments, if the media content is found in the media library of the remote media service 37, proxy server 35 may check to see if User A is a subscriber to a service that will allow access to the media content. If, however, the media content is not found in the media library, the proxy server 35 may check with a third party service provider as to whether User A is a subscriber and whether the service subscribed includes rights to access the media content.

If User A is a subscriber to a service that includes access rights to the media content, whether third party or directly through the remote media service 37, then it is determined that User A has access to the media content. The process then moves to a right block 210. At block 210, access to the media content is integrated into the updated or new list. In various embodiments, access to the media content can include the actual media content from a third party service provider. In various embodiments, this access may include in the updated or new media list a retrieval link for the media content so that the media content can be streamed or downloaded when so desired by User A.

In the alternative, however, if at decision block 207, the proxy server instead determined that User A does not have access rights to the corresponding media content (and access right is required). then the process flows to a left block 211. In block 211, the corresponding media content is not integrated into the updated or new list but information such as title, artist, duration, genre and other information may be integrated. In various embodiments, the information may be integrated along with an offer or other information related to how User A may gain access to the media content. In these embodiments, the information may include subscription information for subscribing to the remote media service 37 or other third party service provider.

Once information about the corresponding media content or access to the corresponding media content has been integrated into the updated list at respective block 210 or block 211, the process flows to a block 213. At a block 213, the proxy server determines whether there is an additional media title on the updated list for which access should be determined. If the answer is yes, the process returns to block 207. The process cycles through blocks 207-213 until it has been determined for each media title added to the updated list whether access to the corresponding media exists.

When each media title has been checked, the process flows to a block 215 where the updates or new media list with either corresponding media content or information related to the corresponding media content for each added title is transmitted to User A. The process then ends at block 217. In various embodiments, the process may be repeated so that User A's media list is updated each time changes or updates are made to user B or a community's media list. In various embodiments, User A may choose to have automatic updates or have updates only upon request. Further note that in various embodiments, the method of presentation of the additional media titles may vary. For example, the information or access to the added media titles may be transmitted separately from the updated list. Note also that in determining whether a user has access to a corresponding media content essentially includes determining whether access to the corresponding media content complies with digital media rights management (DRM) rules.

In various embodiments, for media titles being added to the media playlist with no access right controls, the proxy server may in addition to adding the media title to the updated or new media playlist, provides the portable media player device with the media content or an access link to media content.

Figure 3:
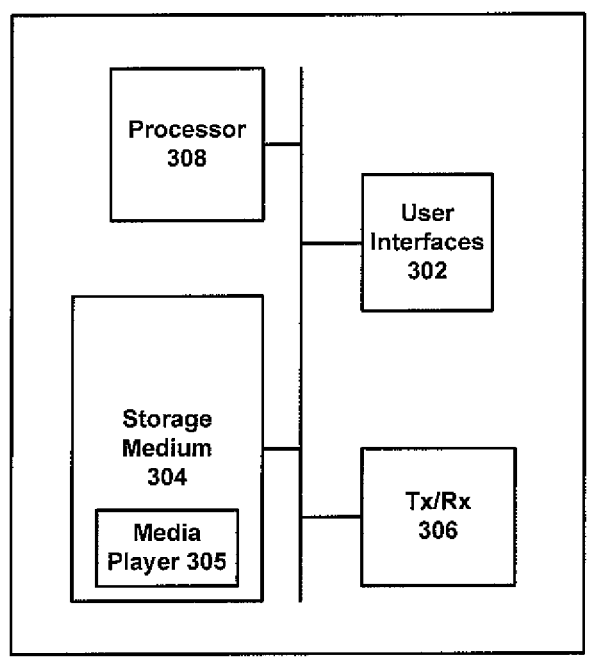
FIG. 3 illustrates a portable media player device in accordance with an embodiment of the invention.

Next, FIG. 3 illustrates an internal component view of an example handheld portable media device player 300 in an embodiment of the invention. In the embodiment shown, a handheld portable media player device 300 includes a processor 308 coupled to user interfaces 302, memory 304 and transmitter/receiver (TX/RX) 306 ("transceiver"). The storage medium 304 includes instructions implementing a media player 305. In alternate embodiments, all or portions of the media player may be implemented in hardware, e.g. hardware components dedicated to encoding/decoding, compression/ decompression, encryption/decryption, digital rights management, signal filtering or other processing. The transceiver 306 may be a radiofrequency (RF) transceiver that in various embodiments may support WiFi, WiMax or other wireless local area network access. In some embodiments, the RF transceiver may support EDGE (Enhanced Data GSM Environment) or G3 communication protocols Accordingly, the transceiver 306 may receive an updated media list from proxy server 35 to provide the updated media list to the processor 308. The updated media list may comprise additional media titles added to a prior local media list that may be stored in the memory 304. In one embodiment, the user interfaces 302 may include a display, touch pad, touch screen and other input/output (I/O) devices or the like (not shown). In various embodiments, the RF transceiver may support WiMax or other wireless local area network access. In other embodiment, the RF transceiver may support EDGE (Enhanced Data GSM Environment) or G3 communication protocols.

In various embodiments, the processor 308 may be configured to receive from the transceiver 306 at least one of a media corresponding to a media title added to the updated media list where access to the media by the first user complies with DRM rules associated with the media or simply information about a media title added to the updated media list where access to the media by the first user does not comply with DRM rules associated with the media by the first user. In various embodiments, the received media or the information about a media, if provided, is provided or caused to be provided by the proxy server 35, in conjunction with the provision of the updated or new media list by the proxy server 35. In the embodiment, a display included in the user interfaces 302 may be adapted to display the updated media list.

Figure 4:
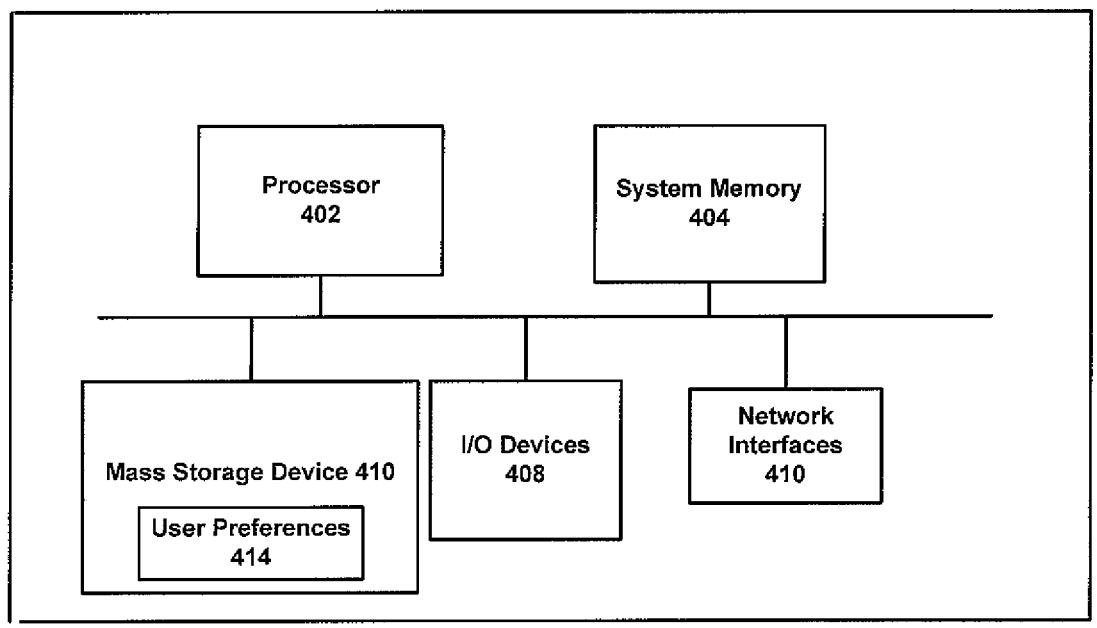
FIG. 4 illustrates a proxy server apparatus, in accordance with an embodiment of the invention.

Finally, FIG. 4 illustrates an internal view of an example computing device 400, suitable for use as proxy server 35, in accordance with embodiments of the present invention. In an embodiment, system memory 404 may have stored thereon instructions which cause one or more processors 402 to generate or retrieve updates or a new media list for a first portable media player device, based at least in part on one or more similarities between media preferences for a first user of a first portable media player device and a second one or more users of a second one or more portable media player devices. The instructions may also be configured to determine the one or more similarities, as well as to determine the media preferences, and/or to gather the data required to determine the media preferences. In various embodiments, gathered data, media preferences 414, and playlists may be stored in mass storage device 410, which may be of a variety of types, including but not limited to optical, magnetic and solid state types. In various embodiments, media preferences 414 may have been determined by computing device 400 based upon media accessed by the first and second one or more users or media preferences 414 may have been received by computing device 400 from another suitable source.

The instructions stored in system memory 404 may further include determining for each media title added to the updated media list whether access right is required to play the media title, and if so, whether the first user or the first portable media player device is a subscriber to a media service that has access to the media title added to the updated media list. In various embodiments, a media corresponding to a media title added to the updated or new media list where the first user or the first portable media player device is a subscriber to the media service, or an offer to acquire the media from the media service or a third party service where the first user or the first portable media player device is not a subscriber to the media service may be transmitted or caused to be transmitted, via the network interface 410.

In various embodiments, network interfaces 410 may include network interface cards, modems and so forth. In various embodiments, network interfaces 410 may be configured to support a wire lined base local area networking protocol, e.g. Ethernet. In the embodiments shown, the apparatus 400 may also include general purpose input/output (I/O) devices 408. The one or more processors 402, system memory 404, mass storage device 410, I/O devices 408 and network interfaces 410 are coupled to each other via system bus 412, which represents one or more buses. In the case of multiple buses, they are bridged by one or more bus bridges (not shown). In alternate embodiments, other elements may be added, as well as having one or more of the illustrated elements omitted, without departing from the spirit and scope of the present invention.

Thus, it can be seen from the above description, methods and apparatuses for updating or adding media lists in portable media player devices via proxy server is described. Thus, in an embodiment, media titles and media content of songs, videos, photos, podcasts, audiobooks or other preferred media may be used to update a first user's playlist or his playlist collection based upon a media list of a second one or more users with similar media preferences or based upon a media list compiled at or by a remote media service 37 (or a third party service), while automatically respecting the access rights of the media titles being added. If access right is required for a media title, and a user has access rights to the corresponding media, then the media or an access link to the media is transmitted by the proxy server to the portable media device of the first user (along with the updates and/or new media list). If the user does not have a subscription or other access to the corresponding media, then the proxy server may transmit the updated or new list to the first user with information as to how to access the media whether by subscription or other third party service.

As mentioned earlier, while the present invention has been described in terms of the above-illustrated embodiments, the present invention is not limited to the embodiments described. The present invention can be practiced with modification and alternation within the spirit and scope of the appended claims. Thus, the description is to be regarded as illustrative instead of restrictive on the present invention.

What is claimed is:

1. A method comprising:
   generating, by a proxy server, updates to an already existing first media playlist of a first portable media player device, the generating comprising:
   comparing, by the proxy server, media preferences of a first user of the first portable media player device with media preferences of at least a second user of a second portable media player device to identify similarities between the media preferences of the first user and the media preferences of the second user; and selecting, by the proxy server accessing on the second portable media player device a second media playlist associated with the second user and maintained on the second portable media player device, one or more respective media titles from the second media playlist as the updates to the already existing first media playlist, wherein the one or more respective media titles are selected based on the comparison of the media preferences of the first user with the media preferences of the at least a second user, including the similarities identified, wherein the already existing first media playlist comprises a user-defined listing of media titles organizing a grouping of corresponding pieces of media content, wherein the updates to the already existing first media playlist comprise suggested media titles to be integrated into the already existing first media playlist, and wherein the already existing first media playlist is one of a plurality of user-defined media playlists of the first portable media player device;

determining for the one or more respective media titles of the updates, by the proxy server, whether the first user of the first portable media player device or the first portable media player device has access rights to one or more corresponding pieces of media content for the respective media titles of the updates;

transmitting the updates to the first portable media player device, by the proxy server; and transmitting or causing to be transmitted, by the proxy server:

one or more first pieces of media content, corresponding to titles added to the updates to the already existing first media playlist, if the first user or the first portable media player device was determined to have access rights to the one or more first pieces of media content; or information about one or more media titles added to the updates to the already existing first media playlist corresponding to one or more second pieces of media content, if the first user or the first portable media player device was determined not to have access rights, wherein the information includes subscription information for subscribing to a media service in order to obtain access rights to the one or more second pieces of media content.

2. The method of claim 1 wherein the updated media playlist is generated based at least in part on data gathered relating to the media preferences of the first user of the first portable media player device and the at least a second user of the second portable media player device.

3. The method of claim 1 wherein the media preferences of the first user comprise preferences related to one or more of music, videos, photos, audiobooks or podcasts.

4. The method of claim 1 wherein the determining comprises checking whether the first user or the first portable media player device has access rights to the corresponding pieces of media content with a third party service provider.

5. The method of claim 4 wherein the checking comprises checking with the third party service provider whether the first user is a service subscriber of the third party service provider and if the first user is a service subscriber whether the service subscribed to include rights to access the corresponding pieces of media content.

6. The method of claim 5 wherein the checking comprises checking with the third party service provider whether the corresponding pieces of media content are available from the third party service provider.

7. The method of claim 1 wherein the transmitting of the updates to the first media playlist comprises transmitting updates to a media playlist disposed on the first portable media player device.

8. The method of claim 1 wherein the transmitting or causing to be transmitted comprises causing a third party service provider to transmit the one or more first pieces of media content to the first user or to the first portable media player device with access rights to the one or more first pieces of media content.

9. The method of claim 1 wherein the transmitting or causing to be transmitted comprises transmitting a retrieval link for a third piece of media content to the first user or to the first portable media player device with access rights to the third piece of media content.

10. The method of claim 1 wherein the transmitting or causing to be transmitted comprises transmitting an offer to acquire the one or more second pieces of media content for which the first user or first portable media player device does not have access rights.

11. A method comprising:

receiving by a first portable media player device, from a proxy server, updates to an already existing first media playlist of the first portable media player device, the updates comprising additional media titles to be integrated into the already existing first media playlist by the first portable media player device, the additional media titles included in a media playlist stored at a remote media service, wherein the updates to the already existing first media playlist are generated by the proxy server:

comparing media preferences of a first user of the first portable media player device with media preferences of a second user of a second portable media player device to identify similarities between the media preferences of the first user and the media preferences of the second user, and selecting, by accessing on the second portable media player device a second media playlist associated with the second user and maintained on the second portable media player device, the additional media titles from the second media playlist as the updates to the already existing first media playlist, wherein the additional media titles are selected based on the comparison of the media preferences of the first user with the media preferences of the second user, including the similarities identified, wherein the already existing first media playlist comprises a user-defined listing of media titles organizing a grouping of corresponding pieces of media content, and wherein the already existing first media playlist is one of a plurality of user-defined media playlists of the first portable media player device;

receiving a first piece of media content corresponding to a first media title of the updates for which the first user or the first portable media player device is determined to have access rights to the first piece of media content; and receiving information about a second media title added to the updates to the already existing first media playlist where the first user or the first portable media player device is determined not to have access rights to a second piece of media content corresponding to the second media title, wherein the information includes subscription information for subscribing to a third party service provider in order to obtain access rights to the second piece of media content, and wherein the first piece of media content or the information about the second media title is provided or caused to be provided by the proxy server in conjunction with the provision of the updates to the first media playlist by the proxy server.

12. The method of claim 11 wherein the updates to the first media playlist are generated based at least in part upon a media playlist stored at the remote media service and selected from a plurality of media playlists, by the first user.

13. The method of claim 11 wherein the additional media titles are added to the prior local media playlist based at least in part on data gathered relating to the media preferences of the first user and the second user.

14. The method of claim 11 wherein the receiving of the first piece of media content corresponding to the first media title being added to the first media playlist comprises receiving the first piece of media content after a check with the third party service provider has determined that the first user is a service subscriber of the third party service provider and the service subscribed includes rights to access the first piece of media content.

15. The method of claim 11 wherein the receiving of the first piece of media content corresponding to the first media title comprises receiving the first piece of media content from the third party service provider.

16. The method of claim 11 wherein the receiving of information about the second media title includes receiving an offer to acquire the second piece of media content, to which the portable media player device does not have access rights.

17. A proxy server apparatus, comprising:
a network interface;
a processor coupled to the network interface; and
a memory coupled to the network interface and the processor, the memory having stored thereon instructions which, when executed by the processor, cause the apparatus to:
generate updates to an already existing first media playlist of a first portable media player device, based at least in part on:
comparing data relating to media preferences of a first user of the first portable media player device with data relating to media preferences of at least a second user of a second portable media device to identify similarities between the media preferences of the first user and the media preferences of the second user, and
selecting, by accessing on the second portable media player device a second media playlist associated with the second user and maintained on the second portable media player device, one or more media titles from the second media playlist as the updates to the already existing first media playlist, wherein the one or more media titles are selected based on the comparison of the data relating to media preferences of the first user with the data relating to media preferences of the at least a second user, including the similarities identified, wherein the already existing first media playlist comprises a user-defined listing of media titles organizing a grouping of corresponding pieces of media content, wherein the updates to the already existing first media playlist comprise suggested media titles to be integrated into the already existing first media playlist, and wherein the already existing first media playlist is one of a plurality of user-defined media playlists of the first portable media player device;
determine for each media title being added to the first media playlist whether the first user or the first portable media player device is a subscriber to a media service that has access to the media title being added to the first media playlist; and
transmit, or cause to be transmitted, via the network interface:
a first piece of media content corresponding to a first media title being integrated into the already existing first media playlist for which the first user or the first portable media player device was determined to be a subscriber to a media service that has access to the first media title; and
an offer to acquire a second piece of media content corresponding to a second media title from a media service that has access to the second media title, wherein the first user or the first portable media player device is determined not to be a subscriber to the media service that has access to the second media title, and wherein the information includes subscription information for subscribing to the media service that has access to the second media title in order to obtain access rights to the second piece of media content.

18. The proxy server apparatus of claim 17 wherein the instructions, when executed, further cause the apparatus to transmit or cause to be transmitted the updates to the first media playlist including transmitting updates to a prior media playlist disposed on the portable media player device.

19. The proxy server apparatus of claim 17, wherein the instructions, when executed, further cause the apparatus to gather the data relating to the media preferences of the first user and the at least a second user.

20. The proxy server apparatus of claim 17, wherein the transmit or cause to be transmitted comprises transmitting a retrieval link for a piece of media content to the first user of the first portable media player device with a subscription to the media service.

21. A handheld portable media player device, comprising:
a user interface;
storage to store media and media playlists;
a media player;
a transceiver;
a processor coupled to the user interface, the storage, the media player, and the transceiver, and configured to control the storage, the media player, and the transceiver to collectively receive updates to an already existing first media playlist, from a proxy server, the updates to the already existing first media playlist comprising additional media titles to be integrated into the already existing first media playlist stored in the storage, wherein the additional media titles are added by the proxy server:
comparing data relating to media preferences of a user of the portable media player device with data relating to media preferences of one or more other users of one or more other portable media player devices to identify similarities between the media preferences of the user and the one or more other users, and
selecting, by accessing on the one or more other portable media player devices one or more second media playlists associated with one or more other users and maintained on one or more other portable media player devices, the additional media titles from the one or more second media playlists as the updates to be added to the already existing first media playlist, wherein the additional media titles are selected based on the comparison of the data relating to media preferences of the user with the data relating to media preferences of the one or more other users, including the similarities identified, wherein the already existing first media playlist comprises a user-defined listing of media titles organizing a grouping of corresponding pieces of media content, and wherein the already existing first media playlist is one of a plurality of user-defined media playlists of the first portable media player device, wherein the processor is further configured to control the storage, the media player and transceiver to receive:

a first piece of media content corresponding to a first media title added to the updates to the already existing first media playlist for which access to the first piece of media content by the user is determined to comply with digital rights management (DRM) rules associated with the first media title; and information about a second media title added to the updates to the already existing first media playlist, wherein access to a second piece of media content corresponding to the second media title by the user is determined not to comply with DRM rules associated with the second media title, wherein the information includes subscription information for subscribing to a media service in order to obtain access rights to the second piece of media content;

wherein the first piece of media content or the information about the second media title is provided or caused to be provided by the proxy servers in conjunction with the provision of the updates to the first media.

22. The handheld portable media device of claim 21 wherein the processor is further configured to control the user interface to present the updated media playlist with a retrieval link for a piece of media content to the user, the retrieval link being provided by the proxy server if the user or the portable media player device access of the media complies with digital rights management rules associated with the piece of media content.

23. The handheld portable media device of claim 21 wherein the processor is further configured to control the storage, the media player, and the transceiver to collectively receive a piece of media content corresponding to a media title added to the first media playlist from a third party service provider.

24. The handheld portable media device of claim 21 wherein the comparing data related to media preferences comprises comparing a preferred music genre of the first user to a preferred music genre of the one or more other users of the one or more other portable media player devices.

25. The method of claim 1, wherein the first media playlist comprises media titles of both at least one audio media file and at least one of a photo media file and a video media file, and wherein the updates to the first media playlist comprise a media title of an audio media file and a media title of one of a media file and a video media file.

* * * * *